(12) United States Patent
Tan et al.

(10) Patent No.: US 9,552,744 B2
(45) Date of Patent: Jan. 24, 2017

(54) VISUAL TEACHING TOOL AND METHOD FOR DETERMINING THE RESULT OF DIGIT MULTIPLICATION BASED-ON DIAGRAM ROTATION AND TRANSITION PATH

(71) Applicants: Claire L. Tan, Taipei (TW); Yu-Cheng Tan, Taipei (TW)

(72) Inventors: Claire L. Tan, Taipei (TW); Yu-Cheng Tan, Taipei (TW)

( * ) Notice: Subject to any disclaimer, the term of this patent is extended or adjusted under 35 U.S.C. 154(b) by 0 days.

(21) Appl. No.: 15/067,167

(22) Filed: Mar. 10, 2016

(65) Prior Publication Data
US 2016/0196768 A1 Jul. 7, 2016

Related U.S. Application Data

(63) Continuation-in-part of application No. 14/016,138, filed on Sep. 2, 2013, now abandoned.

(51) Int. Cl.
*G09B 1/00* (2006.01)
*G09B 19/00* (2006.01)
*G09B 19/02* (2006.01)
*G09B 5/02* (2006.01)
*G06C 15/00* (2006.01)

(52) U.S. Cl.
CPC ............. *G09B 19/025* (2013.01); *G06C 15/00* (2013.01); *G09B 5/02* (2013.01)

(58) Field of Classification Search
USPC .................................................. 434/201, 209
See application file for complete search history.

(56) References Cited

U.S. PATENT DOCUMENTS

2014/0170629 A1* 6/2014 Keim .................... G09B 19/06
434/362

* cited by examiner

*Primary Examiner* — Kesha Frisby
(74) *Attorney, Agent, or Firm* — Chih Feng Yeh; Huntington IP Consulting Co., Ltd.

(57) ABSTRACT

A device for determining the result of digit multiplication based-on diagram-configured carrier rotation and transition path is proposed. Firstly, one of three types of visual teaching tools including first type of visual teaching tool, second type of visual teaching tool and third type of visual teaching tool is selected, then, the first type of or the second type of diagram-configured carrier is rotated to determine an initial node, and thereby transferring multiplicand from digit 1 to digits 3, 7, or 9, or transferring multiplicand from digit 2 to digits 4, 6, or 8. Finally, proceeding number (PN) of the first transition paths, the second transition paths or the third transition paths reaching to an object node is determined to obtain a multiplier and product value of the multiplicand and the multiplier.

8 Claims, 14 Drawing Sheets

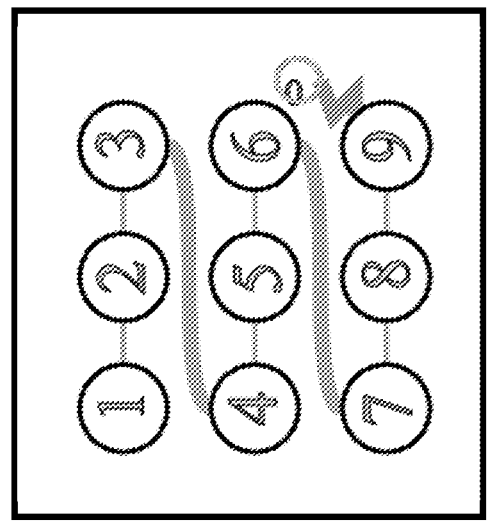
Figure 11c
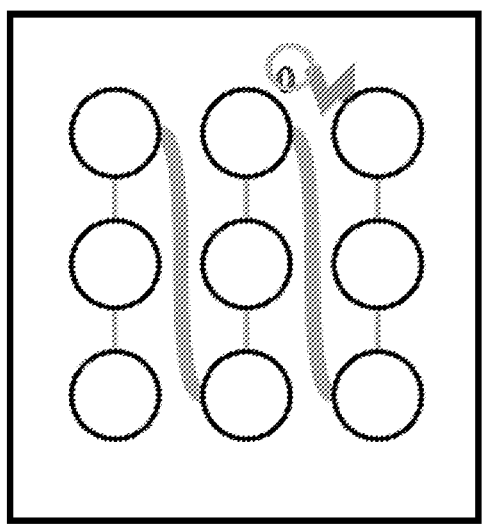
Figure 11a
Figure 11b

VISUAL TEACHING TOOL AND METHOD FOR DETERMINING THE RESULT OF DIGIT MULTIPLICATION BASED-ON DIAGRAM ROTATION AND TRANSITION PATH

CROSS-REFERENCE TO RELATED APPLICATIONS

This application is a continuation-in-part of application Ser. No. 14/016,138, filed 2 Sep. 2013.

TECHNICAL FIELD

The present invention is generally relevant to a teaching tool for digit multiplication, specifically, a visual teaching tool and method for determining the result of digit multiplication based-on diagram rotation and various transition path(s).

BACKGROUND OF RELATED ART

The prior art discloses that mathematics teaching devices, in particular those intended to teach "times tables" or multiplication tables, are well known. These devices usually involve an article upon which the multiplication tables are reproduced in their entirety, and require the student using the device to "cross reference" one number against another, and note the product of those two numbers.

In each device, the numbers are arranged in a grid pattern, and the student is expected to follow one number across, horizontally (an "X" axis) and another number down, vertically (a "Y" axis), to locate the answer (product) of the problem posed. In one manifestation, this process involves the use of wooden (or similar material) pegs which are place at the location of the numbers for which a product is sought, while a third peg is then placed at the intersection of the two numbers, which is the product. Another manifestation substitute's transparent material strips for the pegs, and locates the product at the place where the two strips cross one another, the answer being visibly apparent through the two strips.

Unfortunately, these devices and their methods of use all require that the user of the device be looking at the device, with the answer readily apparent, during the process of determining an answer to the problem posed. There is, by the very design of these devices, a built in encouragement to "cheat" and disclose the answer without having actually thought about it.

Besides, teachers and educators have devised and tested many methods and techniques for teaching multiplication tables to elementary school students. Examples include typed or printed sheets of the multiplication tables, display cards with the equation printed on one side and the answer on the opposite side, and teaching methods an illustrated in recent text books often referred to as "modern math," such techniques being generally tedious and boring to the student. So, that mental enforcement of the multiplication tables is usually accomplished only after long and continuous use of the multiplication tables after progressing to more difficult problems thereby resulting in a slow and gradual understanding of the multiplication process.

Accordingly, there is an obvious need for a simple training device that will teach elementary school students and provide a thorough appreciation and understanding of the multiplication process. Thus, the invention's method is proposed.

SUMMARY

To address the above shortcomings, a visual teaching tool for digit multiplication is proposed for determining the result of digit multiplication based-on diagram rotation and various transition path(s).

One feature of the invention is method for determining the result of digit multiplication by a computing device, comprising: selecting one of three types of visual teaching tools including first type of visual teaching tool, second type of visual teaching tool and third type of visual teaching tool, by the computing device; wherein the first type of visual teaching tool has a 3×3 array nodes with nine digits (1, 2, 3, 4, 5, 6, 7, 8, 9) in the 3×3 array nodes respectively and a tenth node with digit 0 therein, digits (1, 3, 7, 9) locate on its corner of the 3×3 array nodes, and adjacent number order nodes of the 3×3 array nodes are associated with each other via first transition paths; wherein the second type of said visual teaching tool has two 2×2 array nodes with four digits (2, 4, 6, 8) on its corner of each of the 2×2 array nodes and a fifth node and a tenth node with digit 0 therein respectively, and adjacent number order nodes of the two 2×2 array nodes are associated with each other via second transition paths; wherein the third type of the visual teaching tool has four corners nodes with digit 5 therein respectively, a center node with digit 0 therein and a sixth node with digit 0 therein, and each of the four corners nodes is transited from/to the center node with each other via third transition paths. If the first type of visual teaching tool or the second type of visual teaching tool is selected, then rotating the first type of visual teaching tool or the second type of visual teaching tool to determine an initial node by the computing device, wherein digit in the initial node is defined as a multiplicand, and thereby transferring the multiplicand from digit 1 to digits 3, 7, or 9, or transferring the multiplicand from digit 2 to digits 4, 6, or 8. Then, proceeding number (PN) of the first transition paths, the second transition paths or the third transition paths reaching to an object node is determined to obtain a multiplier equal to the PN plus 1 by the computing device such that product value of the multiplicand and the multiplier has a unit place equal to a digit in the object note, and a tens place equal to a number of transition paths for carrying.

As above described, nine digits (1, 2, 3, 4, 5, 6, 7, 8, 9) locate and fix in node (1, 1), node (1, 2), node (1, 3), node (2, 1), node (2, 2), node (2, 3), node (3, 1), node (3, 2), node (3, 3) respectively of the 3×3 array nodes, wherein the four digits (2, 4, 6, 8) locate and fix in node (1, 1), node (1, 2), node (2, 1), node (2, 2) respectively of the 2×2 array nodes.

According an aspect, node transition orders of the first type of visual teaching tool are as follows: $1^{st}$ node (1, 1) proceeding to $2^{nd}$ node (1, 2) via transition path 1, $2^{nd}$ node (1, 2) proceeding to $3^{rd}$ node (1, 3) via transition path 2, $3^{rd}$ node (1, 3) proceeding to $4^{th}$ node (2, 1) via transition path 3, $4^{th}$ node (2, 1) proceeding to $5^{th}$ node (2, 2) via transition path 4, $5^{th}$ node (2, 2) proceeding to $6^{th}$ node (2, 3) via transition path 5, $6^{th}$ node (2, 3) proceeding to $7^{th}$ node (3, 1) via transition path 6, $7^{th}$ node (3, 1) proceeding to $8^{th}$ node (3, 2) via transition path 7, $8^{th}$ node (3, 2) proceeding to $9^{th}$ node (3, 3) via transition path 8, and $9^{th}$ node (3, 3) proceeding to said tenth node via transition path 9.

Besides, node transition orders of the second type of visual teaching tool are as follows: $1^{st}$ node (1, 1) proceeding to $2^{nd}$ node (1, 2) via transition path 1, $2^{nd}$ node (1, 2) proceeding to $3^{rd}$ node (2, 1) via transition path 2, $3^{rd}$ node (2, 1) proceeding to $4^{th}$ node (2, 2) via transition path 3, $4^{th}$ node (2, 2) proceeding to $5^{th}$ node via transition path 4.

Again, node transition orders of the third type of visual teaching tool are as follows: node (1, 1) proceeding to said center node via transition path 1, said center node proceeding to node (1, 2) via transition path 2, node (1, 2) proceeding to said center node via transition path 3, said center node proceeding to node (2, 2) via transition path 4, node (2, 2) proceeding to said center node via transition path 5, said center node proceeding to node (2, 1) via transition path 6, node (2, 1) proceeding to said center node via transition path 7, and said center node proceeding to node (1, 1) via transition path 8, and node (1, 1) proceeding to said sixth node via transition path 9.

The degree of rotating is 90, 180 or 270. The first transition paths, the second transition paths and the third transition paths are divided into two types, the first type of transition paths are for carrying, and the second type of transition paths are for NOT-carry.

According to another aspect, the invention provides a computing device-readable medium including instructions which, when executed by computing device, cause the computing device to perform above-mention steps.

One feature of the invention is providing a device for determining the result of digit multiplication, comprising three types of digits-configured carriers, wherein a first type of digits-configured carrier, has a 3×3 array nodes with nine digits (1, 2, 3, 4, 5, 6, 7, 8, 9) in said 3×3 array nodes respectively; wherein a second type of digits-configured carrier, having two 2×2 array nodes with four digits (2, 4, 6, 8) on its corner of each of said 2×2 array nodes; and wherein a third type of digits-configured carrier, having four corners nodes with digit 5 therein respectively and a center node with 0 therein; three types of diagram-configured carriers, wherein a first type of diagram-configured carrier has a 3×3 array holes and a tenth node with digit 0 therein, and adjacent holes of said 3×3 array holes are associated with each other via first transition paths; wherein a second type of diagram-configured carrier has two 2×2 array holes on its corner of each of said 2×2 array holes and a fifth node and a tenth node with digit 0 therein respectively, and adjacent holes of said two 2×2 array holes are associated with each other via second transition paths; and wherein a third type of diagram-configured carrier has four corners holes, a center hole and a sixth node with digit 0 therein, and each of said four corners holes is transited from/to said center hole with each other via third transition paths; wherein said three types of digits-configured carriers are selected and overlapped by said three types of diagram-configured carriers respectively and performed as a first type of visual teaching tool, a second type of visual teaching tool, and a third type of visual teaching tool, and wherein each digit within said three type of digits-configured carriers is located on each hole within said three type of diagram-configured carriers; if said first type or said second type of visual teaching tool is selected, then rotating said first type or said second type of diagram-configured carrier to determine an initial digit, wherein digit in said initial node is defined as a multiplicand, and thereby transferring said multiplicand from digit 1 to digits 3, 7, or 9, or transferring said multiplicand from digit 2 to digits 4, 6, or 8; if said third type of d visual teaching tool is selected, digit 5 in said initial node is defined as a multiplicand; and wherein a proceeding number (PN) of said first transition paths, said second transition paths or said third transition paths reaching to an object node is determined for obtaining a multiplier equal to said PN plus 1 such that product value of said multiplicand and said multiplier has a unit place equal to a digit in said object note and a tens place equal to a number of transition paths for carrying.

As above described, the nine digits (1, 2, 3, 4, 5, 6, 7, 8, 9) locate on node (1, 1), node (1, 2), node (1, 3), node (2, 1), node (2, 2), node (2, 3), node (3, 1), node (3, 2), node (3, 3) respectively of said 3×3 array nodes, wherein said four digits (2, 4, 6, 8) locate on node (1, 1), node (1, 2), node (2, 1), node (2, 2) respectively of said 2×2 array nodes.

According an aspect, holes transition orders of said first type of diagram-configured carrier are as follows: 1st hole (1, 1) proceeding to 2nd hole (1, 2) via transition path 1, 2nd hole (1, 2) proceeding to 3rd hole (1, 3) via transition path 2, 3rd hole (1, 3) proceeding to 4th hole (2, 1) via transition path 3, 4th hole (2, 1) proceeding to 5th hole (2, 2) via transition path 4, 5th hole (2, 2) proceeding to 6th hole (2, 3) via transition path 5, 6th hole (2, 3) proceeding to 7th hole (3, 1) via transition path 6, 7th hole (3, 1) proceeding to 8th hole (3, 2) via transition path 7, 8th hole (3, 2) proceeding to 9th hole (3, 3) via transition path 8, and 9th hole (3, 3) proceeding to said tenth node via transition path 9.

Besides, the holes transition orders of said second type of diagram-configured carrier are as follows: 1st hole (1, 1) proceeding to 2nd hole (1, 2) via transition path 1, 2nd hole (1, 2) proceeding to 3rd hole (2, 1) via transition path 2, 3rd hole (2, 1) proceeding to 4th hole (2, 2) via transition path 3, 4th hole (2, 2) proceeding to 5th node via transition path 4.

Again, the holes transition orders of said third type of diagram-configured carrier are as follows: hole (1, 1) proceeding to said center hole via transition path 1, said center hole proceeding to hole (1, 2) via transition path 2, hole (1, 2) proceeding to said center hole via transition path 3, said center hole proceeding to hole (2, 2) via transition path 4, hole (2, 2) proceeding to said center hole via transition path 5, said center hole proceeding to hole (2, 1) via transition path 6, hole (2, 1) proceeding to said center hole via transition path 7, and said center hole proceeding to hole (1, 1) via transition path 8, and hole (1, 1) proceeding to said sixth node via transition path 9.

The degree of rotating is 90, 180 or 270. The first transition paths, said second transition paths and said third transition paths are divided into two types, the first type of transition paths are indicated by bold line and are thicker than second type of transition path, and located between changing column or raw holes and reaching to the node with digit 0 therein.

According an aspect, the first type of visual teaching tool, the second type of visual teaching tool, and the third type of visual teaching tool are made from paper or plastic.

BRIEF DESCRIPTION OF THE DRAWINGS

The attached specifications and drawings outline the preferred embodiments of the invention, including the details of its components, characteristics and advantages.

FIGS. 11b, both 12c and 12d, and 13b show a first type of digits-configured carrier, the second type of digits-configured carrier, and the third type of digits-configured carrier, respectively.

FIGS. 11c, both 12e and 12f, and 13c show a non-rotated diagram-configured carrier of the $1^{st}$ type of visual teaching tool, $2^{nd}$ type of visual teaching tool and $3^{rd}$ type of visual teaching tool, respectively.

DETAILED DESCRIPTION

Next, the preferred embodiments of the invention are described in further detail. Notably, however, the preferred embodiments are provided for illustration purposes rather than for limiting the use of the invention. The invention is also applicable in many other embodiments besides those explicitly described, and the scope of the invention is not expressly limited except as specified in the accompanying claims.

The invention provides a visual teaching tool for digit multiplication to determine the result of digit multiplication based-on diagram rotation and various transition path(s) by a computing device, without transitional multiplication table or times table.

Figure 1:
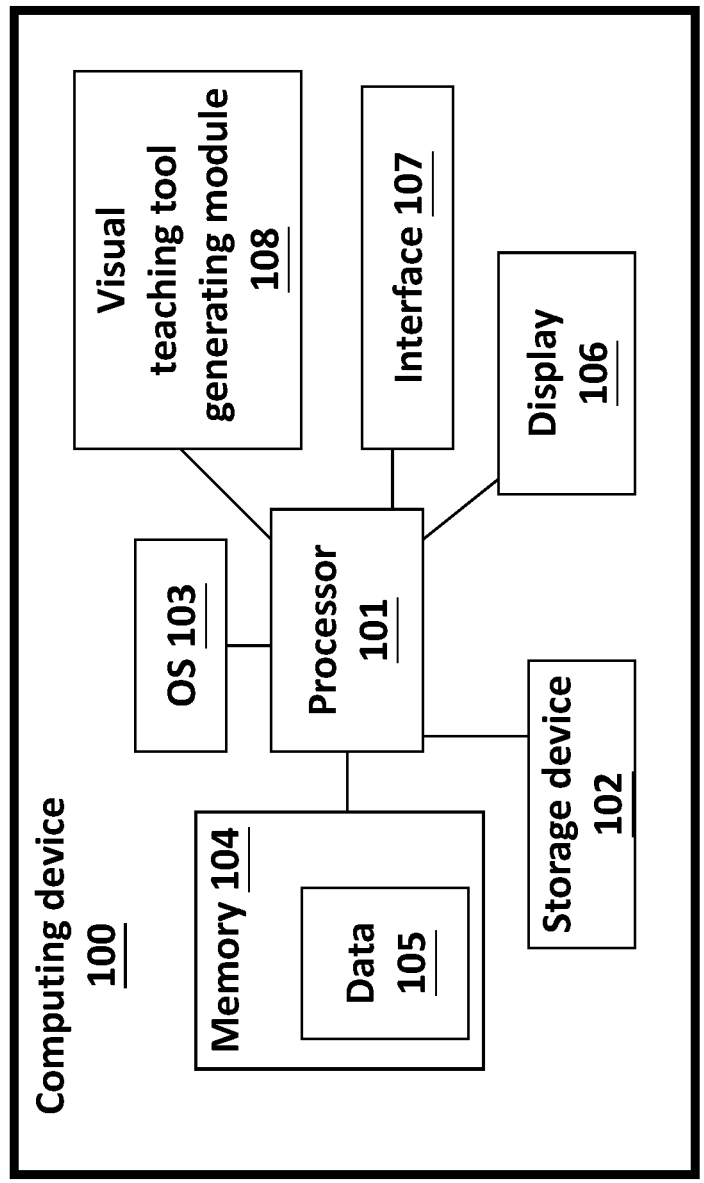
FIG. 1 shows a block diagram of an embodiment of a computing device for implementing an embodiment of a method according to the invention.

FIG. 1 shows a block diagram of an embodiment of a computing device for implementing an embodiment of a method according to the invention. The computing device includes computer, smart phone or tablet. The computing device 100 includes a processor 101, a storage device 102, an operating system (OS) 103, a memory 104, a display 106, interfaces 107 and a visual teaching tool generating module 108. The storage device 102, the operating system (OS) 103, the memory 104, the display 106, the interfaces 107 and the visual teaching tool generating module 108 are coupled to the processor 101. Examples of the storage device 102 include hard drive (HD), SD or EPROM. The processor 101 may be implementing programs to encode or decode data. The memory 104 contains data 105. The display 106 may include a liquid crystal display (LCD), a plasma display, a cathode ray tube (CRT) display, or any other display technology, for displaying information or content to a user. The interfaces 107 include for example audio/video (A/V) interface, mouse interface, keyboard interface, USB interface . . . etc. The visual teaching tool generating module 108 is capable of generating a visual teaching tool for digit multiplication.

The proposed method for digit multiplication of a multiplicand and a multiplier based-on diagram rotation and various transition path(s) to obtain a product value is capable of performing by the computing device 100.

The proposed method for digit multiplication of a multiplicand and a multiplier based-on diagram rotation and various transition path(s) to obtain a product value is described further below.

(1) Determine Multiplicand

First, one of three types of visual teaching tools is selected. The three types of visual teaching tools are generated by the visual teaching tool generating module 108, and displaying on the display 106. An initial node on one of the four corners is determined based on the selected one of three types of visual teaching tools. The digit in the initial node is the multiplicand (or multiplier as "commutative law"). The multiplicand and the multiplier can be changeable with each other.

Figure 2:
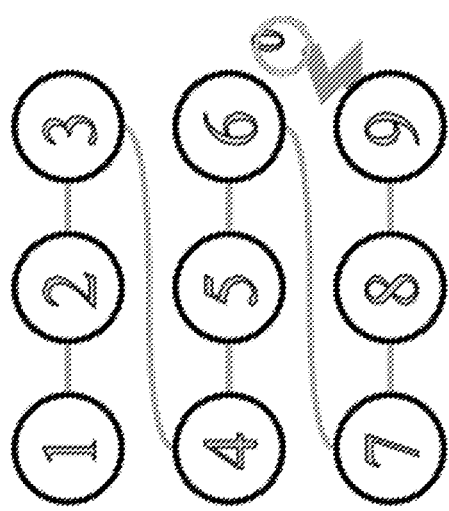
FIG. 2 shows the first type of visual teaching tool according to one embodiment of the invention.

FIG. 2 shows the first type of visual teaching tool. The first type of visual teaching tool has a 3×3 array nodes with nine digits (1, 2, 3, 4, 5, 6, 7, 8, 9) in their nodes, respectively, and the tenth node with digit 0 therein. Thus, the first type of visual teaching tool consists of ten digits (1, 2, 3, 4, 5, 6, 7, 8, 9, 0), ten nodes and nine transition paths. Nine digits (1, 2, 3, 4, 5, 6, 7, 8, 9) locate and fix in node (1, 1), node (1, 2), node (1, 3), node (2, 1), node (2, 2), node (2, 3), node (3, 1), node (3, 2), node (3, 3), respectively. Such nodes are defined by (column, row) node. The 3×3 array nodes have four corners. Four digits (1, 3, 7, 9) locate on its corner of the 3×3 array nodes. Each digit corresponds to a node. Nine digits correspond to nine nodes, respectively. The adjacent number order nodes of the nine nodes are associated with each other via a transition path to form a node string. The node string is a bend string. The transition order is from the initial node to the terminal node. The former node is transited to the next node via the transition path. For example, the node transition orders are as follows: $1^{st}$ node (1, 1) proceeding to $2^{nd}$ node (1, 2) via the first transition path; $2^{nd}$ node (1, 2) proceeding to $3^{rd}$ node (1, 3) via the second transition path; $3^{rd}$ node (1, 3) proceeding to $4^{th}$ node (2, 1) via the third transition path; $4^{th}$ node (2, 1) proceeding to $5^{th}$ node (2, 2) via the fourth transition path; $5^{th}$ node (2, 2) proceeding to $6^{th}$ node (2, 3) via the fifth transition path; $6^{th}$ node (2, 3) proceeding to $7^{th}$ node (3, 1) via the sixth transition path; $7^{th}$ node (3, 1) proceeding to $8^{th}$ node (3, 2) via the seventh transition path; and $8^{th}$ node (3, 2) proceeding to $9^{th}$ node (3, 3) via the eighth transition path. In this example, an initial node is node (1, 1). The digit in the initial node is defined as the multiplicand. So, the multiplicand is 1. That is, the multiplicand of the first type of visual teaching tool is 1. Additionally, node (3, 3) is proceeding to the tenth node with digit 0 via the ninth transition path (last path). The digit in the tenth node is fixed as digit 0. The (tenth) node with digit 0 is terminal (end) node.

Figures 3A, 3B:
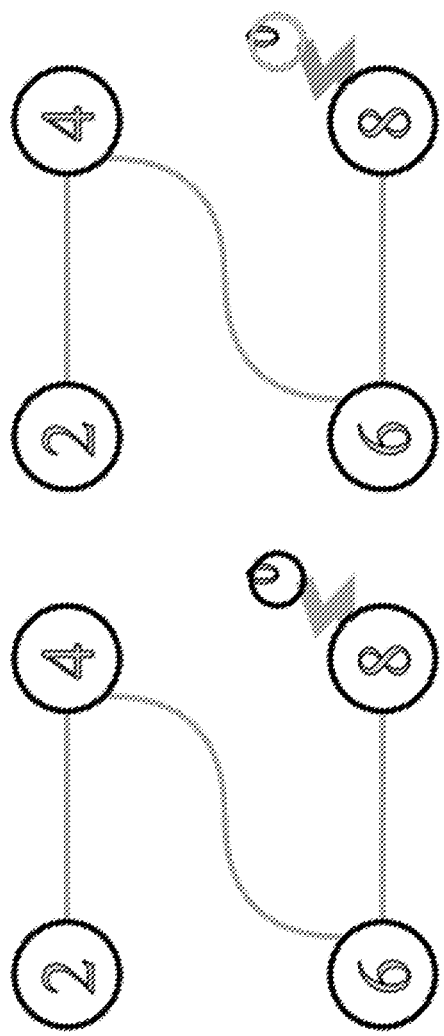
FIGS. 3a and 3b show the second type of visual teaching tool according to one embodiment of the invention.

FIGS. 3a and 3b show the second type of visual teaching tool. The second type of visual teaching tool has two 2×2 array nodes with four digits (2, 4, 6, 8) in their nodes, respectively, and the fifth node with digit 0 therein. Thus, the second type of visual teaching tool consists of five digits (2, 4, 6, 8, 0), ten nodes and eight transition paths. For example, the two array nodes are parallel arrangement, and the two array nodes are identical. Four digits (2, 4, 6, 8) locate in node (1, 1), node (1, 2), node (2, 1), node (2, 2), respectively. Such nodes are defined by (column, row) node. The 2×2 array nodes have four corners (which allocation may be the same as the four corners of the first type of visual teaching tool). Four digits (2, 4, 6, 8) locate on its corner of the 2×2 array nodes. Each digit corresponds to a node. Four digits correspond to four nodes, respectively. The adjacent number order nodes of the four nodes are associated with each other via a transition path to constitute a node string. The node string is a bend string (like a "duck" or letter "Z"). The transition order is from the initial node to the terminal node.

The former node may be transited to the next node via the transition path. For example, the node transition orders are as follows: $1^{st}$ node (1, 1) proceeding to $2^{nd}$ node (1, 2) via the first transition path; $2^{nd}$ node (1, 2) proceeding to $3^{rd}$ node (2, 1) via the second transition path; $3^{rd}$ node (2, 1) proceeding to $4^{th}$ node (2, 2) via the third transition path. In this example, an initial node is node (1, 1). The digit in the initial node is defined as the multiplicand. So, the multiplicand is 2. That is, the multiplicand of the second type of visual teaching tool is 2. Additionally, node (2, 2) is proceeding to the fifth node with digit 0 via the fourth transition path (last path). The digit in the fifth node is fixed as digit 0. The (fifth) node with digit 0 is terminal (end) node. The sixth to tenth nodes are the same as the first to fifth nodes.

Figure 4:
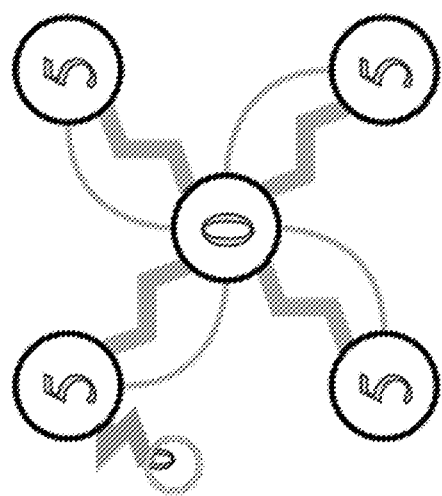
FIG. 4 shows the third type of visual teaching tool according to one embodiment of the invention.

FIG. 4 shows the third type of visual teaching tool. The third type of visual teaching tool has four corners nodes, such as 2×2 array nodes, with digits 5 in their nodes, respectively, and a center node with digit 0 therein. Thus, the third type of visual teaching tool consists of two digits (0, 5), six nodes and nine transition paths. Digit in node (1, 1), node (1, 2), node (2, 1), and node (2, 2) is the same as 5. The node on the four corners is transited from/to the center node with each other via two transition paths, respectively. The transition order is from the initial node to the terminal node. On one embodiment, number and/or order of the transition paths in visual teaching tool may be default without counting. For example, the node transition orders are as follows: node (1, 1) proceeding to the center node via the first transition path; the center node proceeding to node (1, 2) via the second transition path; node (1, 2) proceeding to the center node via the third transition path; the center node proceeding to node (2, 2) via the fourth transition path; node (2, 2) proceeding to the center node via the fifth transition path; the center node proceeding to node (2, 1) via the sixth transition path; node (2, 1) proceeding to the center node via the seventh transition path; and the center node proceeding to node (1, 1) via the eighth transition path. In this example, an initial node is node (1, 1). The digit in the initial node is defined as the multiplicand. So, the multiplicand is 5. That is, the multiplicand of the third type of visual teaching tool is 5. Additionally, node (1, 1) is proceeding to the sixth node with digit 0 via the ninth transition path (last path). The digit in the sixth node is fixed as digit 0. The (sixth) node with digit 0 is terminal (end) node. In other words, the initial node proceeds to the terminal node. The digit in the last node is always 0.

More specific, $1^{st}$ type of visual teaching tool has 4 digits (1, 3, 7, 9) on its corner, $2^{nd}$ type of visual teaching tool has 4 digits (2, 4, 6, 8) on its corner and $3^{rd}$ type of visual teaching tool has digit 5 on its corners. The initial node is always appearing on the corner. So, if multiplicand is 4, the $2^{nd}$ type of digit should be chosen.

Figure 6:
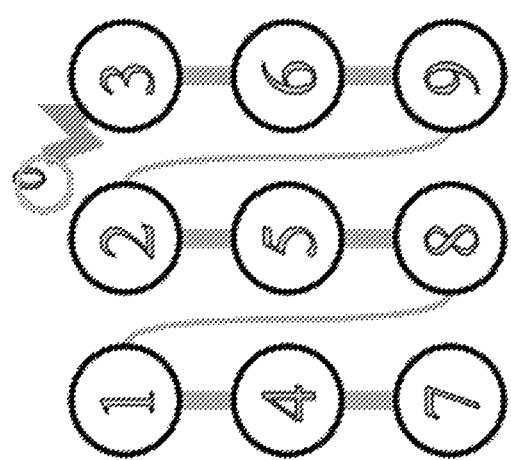
FIG. 6 shows the $1^{st}$ type of visual teaching tool with counter-clockwise rotating 90 degrees.
Figure 7:
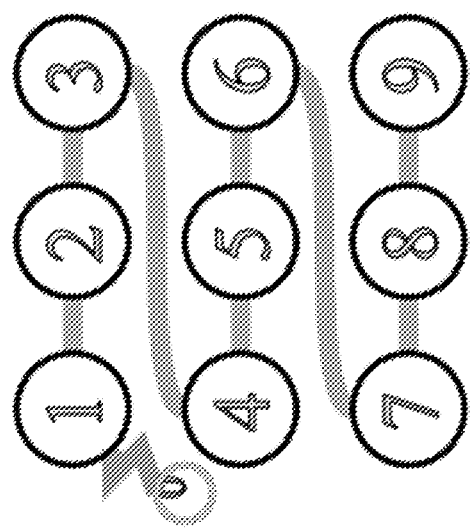
FIG. 7 shows the $1^{st}$ type of visual teaching tool with rotating 180 degrees
Figure 9B:
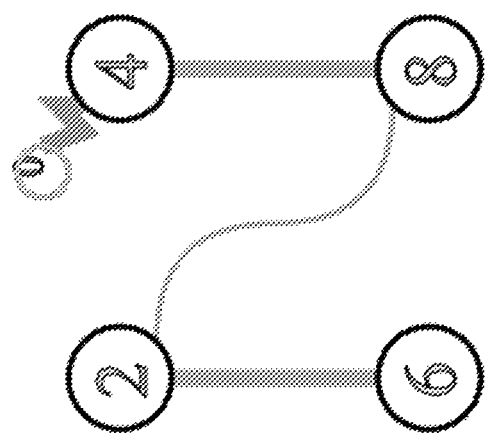
FIGS. 9a and 9b shows the $2^{nd}$ type of visual teaching tool with counter-clockwise rotating 90 degrees.
Figure 9A:
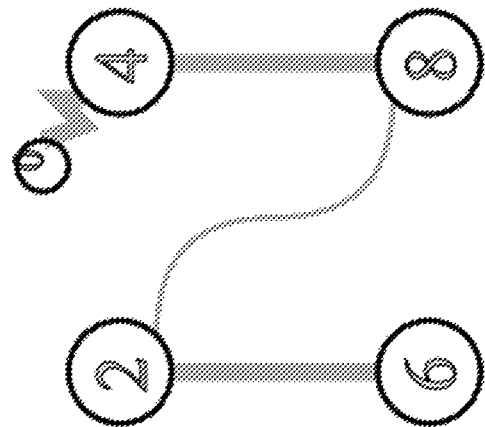
Figure 10B:
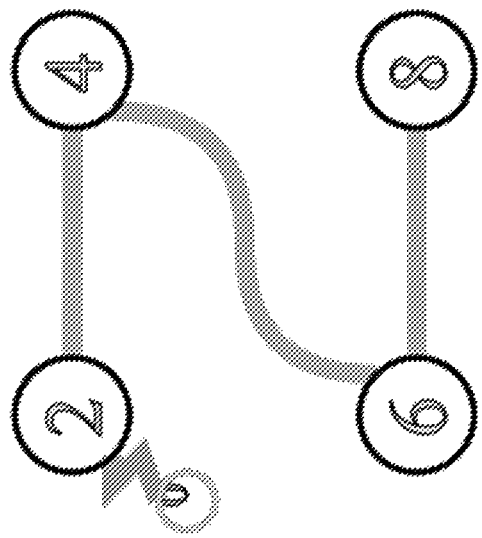
FIGS. 10a and 10b show the $2^{nd}$ type of visual teaching tool with rotating 180 degrees FIGS. 11a, both 12a and 12b, and 13a show a first type of diagram-configured carrier, a second type of diagram-configured carrier, and a third type of diagram-configured carrier, respectively.
Figure 10A:
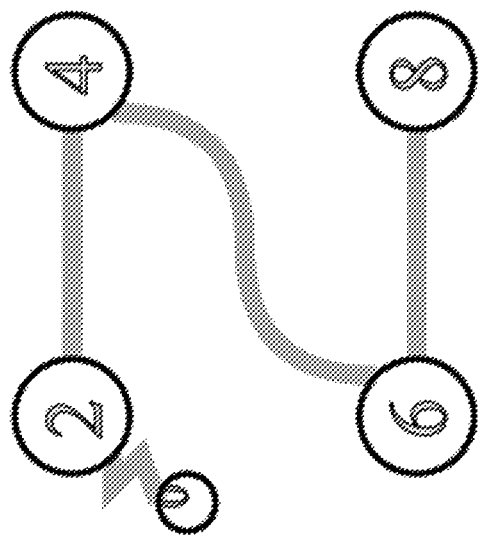
Figure 12A:
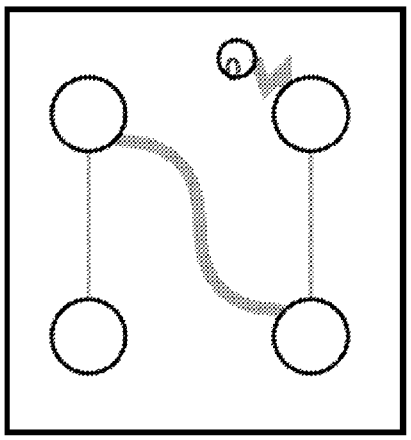
Figure 12B:
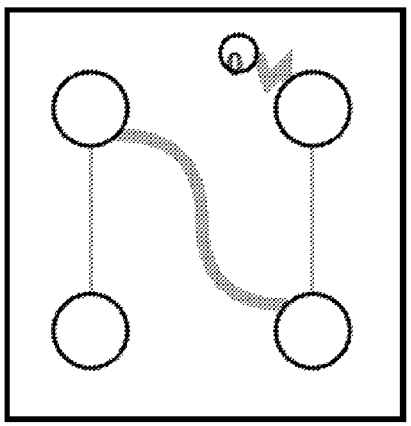
Figure 12C:
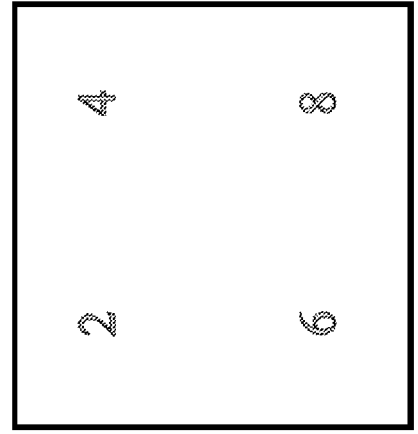
Figure 12D:
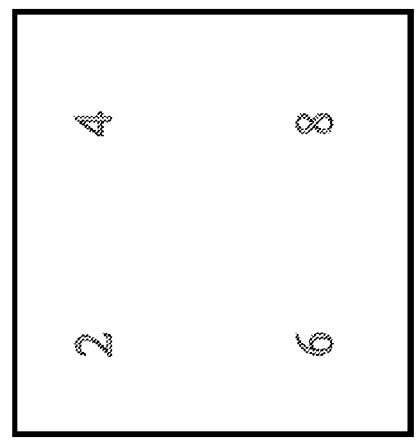
Figure 12F:
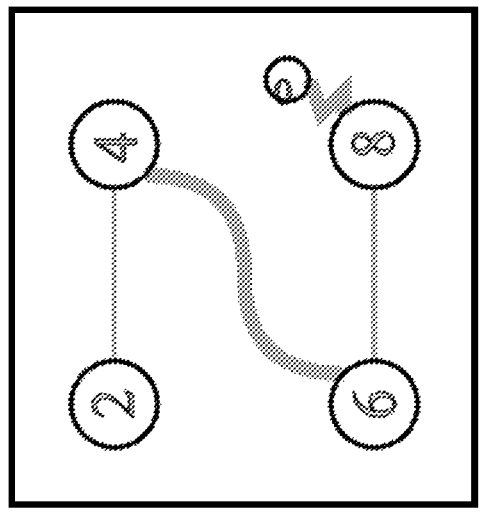
Figure 12E:
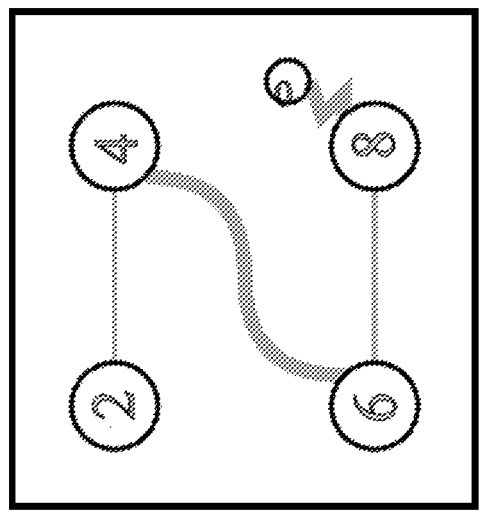

The initial node is determined by rotating visual teaching tool. After rotating, digits in nodes are not changed. Then, digit in the new initial node is the multiplicand. For example, the $1^{st}$ type of visual teaching tool has to transform 90 degrees (clockwise rotation) to see digit 3 appearing on its $1^{st}$ (initial) node, show in FIG. 5. So, the multiplicand is 3. In an example, the $1^{st}$ type of visual teaching tool is transforming 90 degrees (counter-clockwise rotation; or clockwise rotation 270 degrees) to see digit 7 appearing on its $1^{st}$ (initial) node, show in FIG. 6. So, the multiplicand is 7. In another example, the $1^{st}$ type of visual teaching tool is transforming 180 degrees to see digit 9 appearing on its $1^{st}$ (initial) node, show in FIG. 7. So, the multiplicand is 9. Similarly, the $2^{nd}$ type of visual teaching tool has to transform 90 degrees (clockwise rotation) to see digit 4 appearing on its $1^{st}$ (initial) node, show in FIGS. 8a and 8b. So, the multiplicand is 4. In an example, the $2^{nd}$ type of visual teaching tool is transforming 90 degrees (counter-clockwise rotation) to see digit 6 appearing on its $1^{st}$ (initial) node, show in FIGS. 9a and 9b. So, the multiplicand is 6. In another example, the $2^{nd}$ type of visual teaching tool is transforming 180 degrees to see digit 8 appearing on its $1^{st}$ (initial) node, show in FIGS. 10a and 10b.

In one embodiment, the visual teaching tool consists of a digits configuration and a diagram configuration. When the diagram configuration is overlapping on the digits configuration, each digit on the digits configuration locates in the corresponding node of the diagram configuration, respectively. The digits on the digits configuration are still fixed in rotation operation and after rotating. Only the diagram configuration can be rotated. The diagram configuration consists of all nodes and all transition paths. When rotating, the digit 0 is/are rotated together. After rotating, digits of the digits configuration still locate in the nodes of the rotated diagram configuration, respectively. The shape or image (such as circle) of each node of the diagram configuration can be rotated and it still looks the same after rotating. If the diagram configuration ($1^{St}$ layer) and the digits configuration ($2^{nd}$ layer) are different two layers, then rotating the $1^{st}$ layer of the visual teaching tool to determine that the digit in the initial node ($1^{St}$ appearing number) is the multiplicand. For example, $1^{st}$ layer of the $1^{st}$ type of visual teaching tool has to transform 90 degrees to see 3 or 7 appearing on its $1^{st}$ node. Also, if multiplicand is one of digits (1, 2, 5), the $1^{st}$ layer of the visual teaching tool does not rotate as the $1^{st}$ number is already appeared (on the initial node). FIGS. 11a, both 12a and 12b, and 13a show a non-rotate diagram configuration of the $1^{st}$ type of visual teaching tool, $2^{nd}$ type of visual teaching tool and $3^{rd}$ type of visual teaching tool, respectively. The multiplicand is digits 1, 2, 5, respectively. FIGS. 11b, both 12c and 12d, and 13b show a digits configuration of the $1^{st}$ type of visual teaching tool, $2^{nd}$ type of visual teaching tool and $3^{rd}$ type of visual teaching tool, respectively. Remember the digits location.

(2) Determine Multiplier

Follow the transition path on the $1^{st}$ layer of the decided visual teaching tool from above step to determine multiplier.

As noted above, it is bridging node-to-node through the transition path. The $1^{st}$ node is 1 for multiplier. Then, the multiplier increases 1 for every node it proceeding one transition path. The multiplier increases 1 through one transition path. Thus, the multiplier is equal to the proceeding number of the transition path plus 1 (PN+1). For $1^{st}$ type of visual teaching tool and $2^{nd}$ type of visual teaching tool, the multiplier is also equal to the node number (N) from the initial node to the object node. For example, when hits digit 4 of $2^{nd}$ type of visual teaching tool (4 appearing on the node) as the multiplicand is 6 (shown in FIG. 9a and FIG. 9b), the proceeding number of the transition path is 3, and the node number from the initial node (2, 1) to the object node (1, 2) is 4. The object node is the fourth node and obtained through three transition paths. So, the multiplier is 4.

(3) Determine "Units" Place (The Second Digit of Result)

As described on above step, once the multiplicand and the multiplier are determined, the result (product value) may be obtained.

Unit place of the result is the digit as it appears in the selected node. The unit place is the second digit of the result if the product value is two-digits number.

Figure 5:
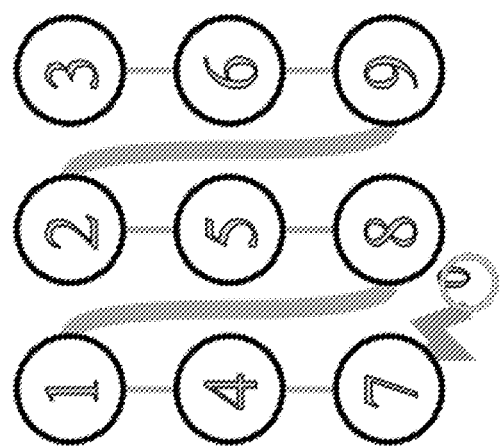
FIG. 5 shows the $1^{st}$ type of visual teaching tool with clockwise rotating 90 degrees.

For example, as the multiplicand is 3, shown in the FIG. 5; for $1^{st}$ node (three times one) the unit place is 3; for proceeding to $2^{nd}$ node (three times two) the unit place is 6; for proceeding to $3^{rd}$ node (three times three) the unit place is 9; for proceeding to $4^{th}$ node (three times four) the unit place is 2; for proceeding to $5^{th}$ node (three times five) the unit place is 5; for proceeding to $6^{th}$ node (three times six) the unit place is 8; for proceeding to $7^{th}$ node (three times seven) the unit place is 1; for proceeding to $8^{th}$ node (three times eight) the unit place is 4; for proceeding to $9^{th}$ node (three times nine) the unit place is 7; for proceeding to the tenth node (three times ten) the unit place is 0. The digits (3, 6, 9, 2, 5, 8, 1, 4, 7, 0) appearing in the object nodes are unit place of ten product values, respectively. Based-on the FIG. 6, digits (7, 4, 1, 8, 5, 2, 9, 6, 3, 0) appearing in the object nodes are unit place of product, respectively. Similarly, according to the FIG. 7, digits (9, 8, 7, 6, 5, 4, 3, 2, 1, 0) appearing in the object nodes are unit place of product, respectively.

Figure 8B:
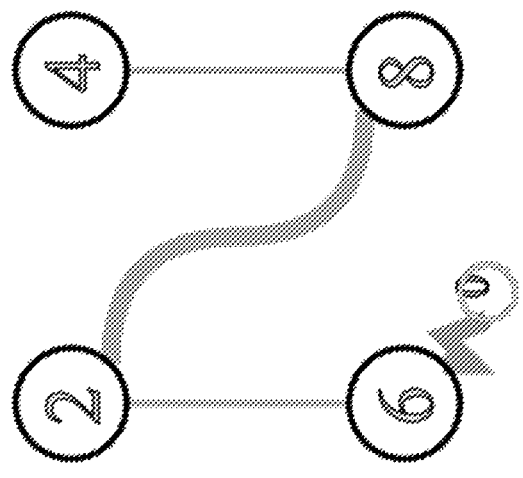
FIGS. 8a and 8b show the $2^{nd}$ type of visual teaching tool with clockwise rotating 90 degrees.
Figure 8A:
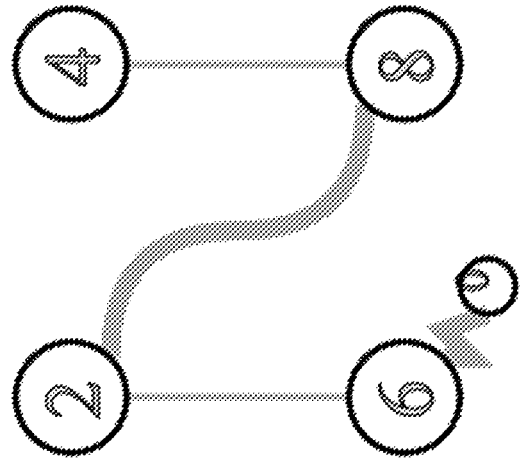

For example, as the multiplicand is 4, shown in the FIG. 8a and FIG. 8b; for $1^{st}$ node (four times one) the unit place is 4; for proceeding to $2^{nd}$ node (four times two) the unit place is 8; for proceeding to $3^{rd}$ node (four times three) the unit place is 2; for proceeding to $4^{th}$ node (four times four) the unit place is 6; for proceeding to $5^{th}$ node (four times five) the unit place is 0; for proceeding to $6^{th}$ node (four times six) the unit place is 4; for proceeding to $7^{th}$ node (four times seven) the unit place is 8; for proceeding to $8^{th}$ node (four times eight) the unit place is 2; for proceeding to $9^{th}$ node (four times nine) the unit place is 6; for proceeding to tenth node (four times ten) the unit place is 0. The digits (4, 8, 2, 6, 0, 4, 8, 2, 6, 0) appearing in the object nodes are unit place of ten product values, respectively. Based-on the FIG. 9a and FIG. 9b, digits (6, 2, 8, 4, 0, 6, 2, 8, 4, 0) appearing in the object nodes are unit place of product, respectively. Similarly, according to the FIG. 10a and FIG. 10b, digits (8, 6, 4, 2, 0, 8, 6, 4, 2, 0) appearing in the object nodes are unit place of product, respectively.

For example, as the multiplicand is 5, shown in the FIG. 4; through $1^{st}$ transition path to the center node (five times two) the unit place is 0; through $2^{nd}$ transition path to $2^{nd}$ node (five times three) the unit place is 5; through $3^{rd}$ transition path back to the center node (five times four) the unit place is 0; through $4^{th}$ transition path to $3^{rd}$ node (five times five) the unit place is 5; through $5^{th}$ transition path back to the center node (five times six) the unit place is 0; through $6^{th}$ transition path to $4^{th}$ node (five times seven) the unit place is 5; through $7^{th}$ transition path back to the center node (five times eight) the unit place is 0; through $8^{th}$ transition path back to $1^{st}$ node (five times nine) the unit place is 5; through $9^{th}$ transition path to $6^{th}$ node (five times ten) the unit place is 0. The center node is $5^{th}$ node. The digits (5, 0, 5, 0, 5, 0, 5, 0, 5, 0) appearing in the object nodes are unit place of product, respectively.

(4) Determine "Tens" Place (The First Digit of Result)

As described on above step, once the multiplicand and the multiplier are determined, the result (product value) may be obtained.

The multiplicand and the multiplier are determined based-on the diagram rotation and the transition paths. The transition paths in the visual teaching tool are divided into two types. The first type of transition paths are for carrying, and the second type of transition paths are for NOT-carry.

Tens place is the number of the first type of transition path for carrying. The tens place is the first digit of the result if the product value is two-digits number.

For example, as the multiplicand is 3, shown in the FIG. 5; it should be noted that the number of the first type of transition path for carrying is 3. In this example, the first type of transition path for carrying is indicated by bold line, and the second type of transition path for NOT-carry is indicated by non-bold line. The bold line may be at the locations between adjacent nodes, changing column or row nodes, or reaching to the digit "0" node. The number of the bold lines is equal to multiplicand. As the multiplicand is 3, the three bold lines locate between $3^{rd}$ node and $4^{th}$ node (changing column nodes), $6^{th}$ node and $7^{th}$ node (changing column nodes), $9^{th}$ node and tenth node (reaching to the digit "0" node), respectively. Thus, when hit "2", it is passing through the first bold line, the result is 12, with unit place 2; when hit "1", it is passing through the first and second bold lines, the result is 21, with unit place 1; when hit "0", it is passing through the first, second and third bold lines, the result is 30, with unit place 0. Based-on the FIG. 6, as the multiplicand is 7, the number of the first type of transition path for carrying is 7. The seven bold lines (locate between adjacent nodes, and reaching to the digit "0" node) are the first type of transition paths for carrying, and the two non-bold lines are the second type of transition paths for NOT-carry. Similarly, according to the FIG. 7, as the multiplicand is 9, the number of the first type of transition path for carrying is 9. All of nine bold lines are the first type of transition paths for carrying, and the second type of transition path is zero.

For example, as the multiplicand is 4, shown in the FIG. 8a and FIG. 8b; it should be noted that the number of the first type of transition path for carrying is 4. The four bold lines are the first type of transition path for carrying, and the four non-bold lines are the second type of transition path for NOT-carry. The four bold lines locate between $2^{nd}$ node and $3^{rd}$ node, $4^{th}$ node and $5^{th}$ node, $7^{th}$ node and $8^{th}$ node, $9^{th}$ node and tenth node, respectively. Thus, when hit $1^{st}$ "2", it is passing through the first bold line, the result is 12, with unit place 2; when hit $1^{st}$ "0", it is passing through the first and second bold lines, the result is 20, with unit place 0; when hit $1^{st}$, "2", it is passing through the first, second and third bold lines, the result is 32, with unit place 2 when hit $2^{nd}$ "0", it is passing through the first, second, third and fourth bold lines, the result is 40, with unit place 0. Based-on the FIG. 9a and FIG. 9b, as the multiplicand is 6, the number of the first type of transition path for carrying is 6. The six bold lines are the first type of transition path for carrying, and the two non-bold lines are the second type of transition path for NOT-carry. Similarly, according to the FIG. 10a and FIG. 10b, as the multiplicand is 8, the number of the first type of transition path for carrying is 8. All of eight bold lines are the first type of transition path for carrying, and the second type of transition path is zero.

Besides, based-on the FIG. 4, as the multiplicand is 5, the number of the first type of transition path for carrying is 5. The five bold lines are the first type of transition paths for carrying, and the five non-bold lines are the second type of transition paths for NOT-carry.

As described above, the invention proposes a method for digit multiplication based-on diagram rotation and transition path combining with the fixed digits configuration to provide an intuition, visualization approach to determine the product of digit multiplication.

In one embodiment, the visual teaching tool consists of three types of digits-configured carriers and three types of diagram-configured carriers. All the digits-configured carriers and the diagram-configured carriers can be made from various materials, such as paper or plastic.

For example, the three types of digits-configured carriers includes a first type of digits-configured carriers having nine digits (1, 2, 3, 4, 5, 6, 7, 8, 9) displayed in a 3×3 array nodes, a second type of digits-configured carriers having four digits (2, 4, 6, 8) displayed in a 2×2 array nodes, and a third type of digits-configured carriers having two digits (5, 0), wherein the digit 5 is displayed in a 2×2 array nodes and the digit 0 is displayed in the central of the 2×2 array nodes. FIG. 11$b$, both FIGS. 12$c$ and 12$d$, and FIG. 13$b$ show the first, second and third type of digits-configured carriers respectively and the shape of them may be designed as circle or square. In one embodiment, the shape of three types of digits-configured carriers is shown in circle.

The three types of diagram-configured carriers includes a first type of diagram-configured carrier having nine holes displayed in a 3×3 array and a tenth node with digit 0 therein, and adjacent holes of the 3×3 array holes are associated with each other via first transition paths; a second type of diagram-configured carrier having two 2×2 array holes and a fifth node and tenth node with digit 0 therein, and adjacent holes of the two 2×2 array holes are associated with each other via second transition paths; a third type of diagram-configured carrier having four corners holes, a center hole and a sixth node with digit 0 therein, and each of said four corners holes is transited from/to said center hole with each other via third transition paths; FIG. 11$a$, both FIGS. 12$a$ and 12$b$, and FIG. 13$a$ show the first, second and third type of diagram-configured carriers respectively and the shape of them may be designed as circle or square. Here, the shape of three types of diagram-configured carriers is shown in square for illustrating clearly.

A proceeding number (PN) of the first transition paths, the second transition paths or the third transition paths reaching to an object node is determined for obtaining a multiplier equal to said PN plus 1 such that product value of said multiplicand and said multiplier has a unit place equal to a digit in said object note and a tens place equal to a number of transition paths for carrying.

The diagram-configured carrier ($1^{st}$ layer) and the digits-configured carrier ($2^{nd}$ layer) are different two layers, each digits-configured carrier is overlapped by the corresponding diagram-configured carrier respectively. When the diagram-configured carrier is overlapping on the digits-configured carrier and performed as a $1^{st}$ type of visual teaching tool, a $2^{nd}$ type of visual teaching tool, and a $3^{rd}$ type of visual teaching tool respectively, each digit of the digits-configured carrier locates in the corresponding hole of the diagram-configured carrier, respectively. If the $1^{st}$ type or the $2^{nd}$ type of visual teaching tool is selected, then only rotating the first type or the second type of diagram-configured carrier to determine an initial digit, wherein digit in said initial node is defined as a multiplicand, and thereby transferring the multiplicand from digit 1 to digits 3, 7, or 9, or transferring the multiplicand from digit 2 to digits 4, 6, or 8. In FIG. 11$c$, it shows the digit 1 as the multiplicand, and in FIGS. 12$e$ and 12$f$, it shows the digit 2 as the multiplicand. After rotating, digits of the digits-configured carriers still locate in and correspond with the holes of the rotated diagram-configured carriers, respectively.

For example, $1^{st}$ layer of the $1^{st}$ type of visual teaching tool has to transform 90 degrees to see 3 or 7 appearing on its $1^{st}$ node. Also, if multiplicand is one of digits (1, 2, 5), the $1^{st}$ layer of the visual teaching tool does not rotate as the $1^{st}$ number is already appeared (on the initial node). FIGS. 11$c$, both 12$e$ and 12$f$ and FIG. 13$c$ show a non-rotate diagram-configured carrier of the $1^{st}$ type of visual teaching tool, $2^{nd}$ type of visual teaching tool and $3^{rd}$ type of visual teaching tool, respectively. The multiplicand is digits 1, 2, 5, respectively. FIGS. 11$b$, both 12$c$ and 12$d$, and 13$b$ show a digits-configured carrier of the $1^{st}$ type of visual teaching tool, $2^{nd}$ type of visual teaching tool and $3^{rd}$ type of visual teaching tool, respectively.

Figure 13C:
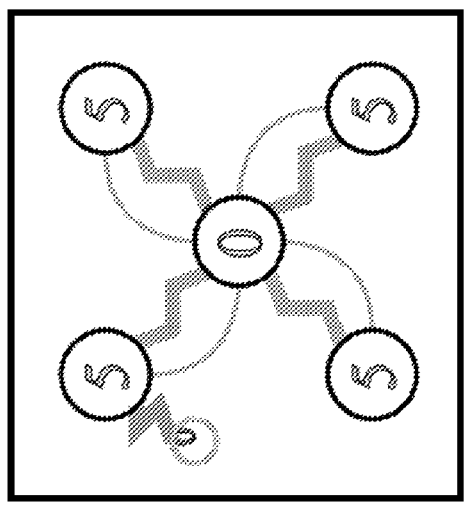
Figure 13A:
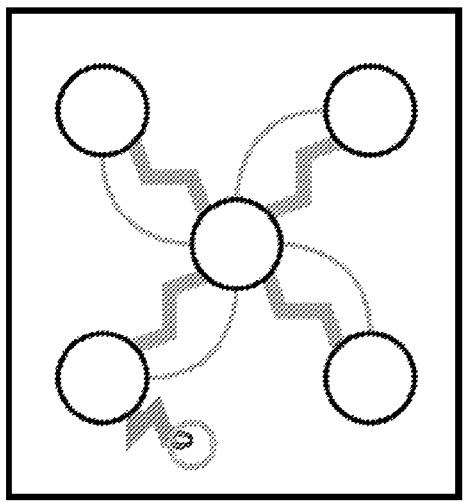
Figure 13B:
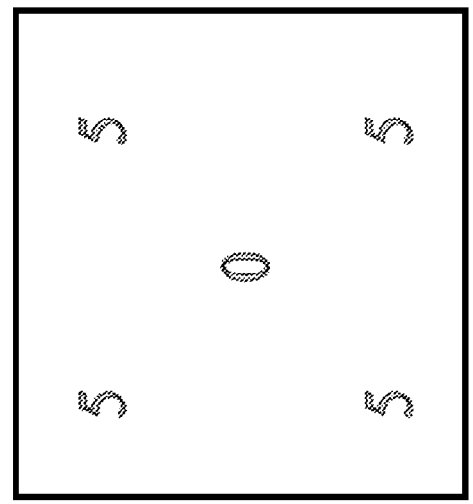

Referring to FIG. 13$c$, if the $3^{rd}$ type of visual teaching tool is selected, digit 5 located on the initial node is defined as a multiplicand. After rotating, digits of the digits-configured carrier still locate in and correspond with the holes of the rotated diagram-configured carriers, respectively In one embodiment, the degree of rotating of said three types of diagram-configured carriers may be 90, 180, and 270.

In one embodiment, shown in FIG. 11$a$, the holes transition orders of the first type of diagram-configured carrier are as follows: $1^{st}$ hole (1, 1) proceeding to $2^{nd}$ hole (1, 2) via transition path 1, $2^{nd}$ hole (1, 2) proceeding to $3^{rd}$ hole (1, 3) via transition path 2, $3^{rd}$ hole (1, 3) proceeding to $4^{th}$ hole (2, 1) via transition path 3, $4^{th}$ hole (2, 1) proceeding to $5^{th}$ hole (2, 2) via transition path 4, $5^{th}$ hole (2, 2) proceeding to $6^{th}$ hole (2, 3) via transition path 5, $6^{th}$ hole (2, 3) proceeding to $7^{th}$ hole (3, 1) via transition path 6, $7^{th}$ hole (3, 1) proceeding to $8^{th}$ hole (3, 2) via transition path 7, $8^{th}$ hole (3, 2) proceeding to $9^{th}$ hole (3, 3) via transition path 8, and $9^{th}$ hole (3, 3) proceeding to said tenth node via transition path 9.

In one embodiment, shown in FIG. 11$b$, the nine digits (1, 2, 3, 4, 5, 6, 7, 8, 9) of the first type of digits-configured carrier locate on node (1, 1), node (1, 2), node (1, 3), node (2, 1), node (2, 2), node (2, 3), node (3, 1), node (3, 2), node (3, 3) respectively of said 3×3 array nodes.

In one embodiment, shown in FIGS. 12$a$ and 12$b$, the holes transition orders of the second type of diagram-configured carrier are as follows: $1^{st}$ hole (1, 1) proceeding to $2^{nd}$ hole (1, 2) via transition path 1, $2^{nd}$ hole (1, 2) proceeding to $3^{rd}$ hole (2, 1) via transition path 2, $3^{rd}$ hole (2, 1) proceeding to $4^{th}$ hole (2, 2) via transition path 3, $4^{th}$ hole (2, 2) proceeding to $5^{th}$ node via transition path 4. In one embodiment, shown in FIGS. 12$c$ and 12$d$, the four digits (2, 4, 6, 8) of the second type of digits-configured carrier locate on node (1, 1), node (1, 2), node (2, 1), node (2, 2) respectively of the 2×2 array nodes.

In one embodiment, the first transition paths, the second transition paths and the third transition paths are divided into two types, the first type of transition paths are indicated by bold line and are thicker than second type of transition path, and located between changing column or raw holes and reaching to the digit 0.

As noted above, the invention proposes a device for digit multiplication based-on diagram rotation and transition path combining with the located digits configuration to provide an intuition, visualization approach to determine the product of digit multiplication.

For a person skilled in the art, the preferred embodiments described above are illustrations rather than limitations of the applications of the invention. The invention is intended to enable various modifications, and similar arrangements are included within the spirit and scope of the appended claims, the scope of which should be accorded the broadest interpretation so as to encompass all such modifications and similar structures.

What is claimed is:

1. A device for determining the result of digit multiplication, comprising:

three types of digits-configured carriers, wherein a first type of digits-configured carrier, has a 3×3 array nodes with nine digits (1, 2, 3, 4, 5, 6, 7, 8, 9) in said 3×3 array nodes respectively; wherein a second type of digits-configured carrier, having two 2×2 array nodes with four digits (2, 4, 6, 8) on its corner of each of said 2×2 array nodes; and a third type of digits-configured carrier, having four corners nodes with digit 5 therein respectively and a center node with 0 therein;

three types of diagram-configured carriers, wherein a first type of diagram-configured carrier has a 3×3 array holes and a tenth node with digit 0 therein, and adjacent holes of said 3×3 array holes are associated with each other via first transition paths; a second type of diagram-configured carrier has two 2×2 array holes on its corner of each of said 2×2 array holes and a fifth node and a tenth node with digit 0 therein respectively, and adjacent holes of said two 2×2 array holes are associated with each other via second transition paths; and a third type of diagram-configured carrier has four corners holes, a center hole and a sixth node with digit 0 therein, and each of said four corners holes is transited from/to said center hole with each other via third transition paths;

wherein said three types of digits-configured carriers are selected and overlapped by said three types of diagram-configured carriers respectively and then performed as a first type of visual teaching tool, a second type of visual teaching tool, and a third type of visual teaching tool, and wherein each digit within said three type of digits-configured carriers is located on each hole within said three type of diagram-configured carriers;

if said first type or said second type of visual teaching tool is selected, then rotating said first type or said second type of diagram-configured carrier to determine an initial digit, wherein digit in said initial node is defined as a multiplicand, and thereby transferring said multiplicand from digit 1 to digits 3, 7, or 9, or transferring said multiplicand from digit 2 to digits 4, 6, or 8; if said third type of d visual teaching tool is selected, digit 5 in said initial node is defined as a multiplicand; and wherein a proceeding number (PN) of said first transition paths, said second transition paths or said third transition paths reaching to an object node is determined for obtaining a multiplier equal to said PN plus 1 such that product value of said multiplicand and said multiplier has a unit place equal to a digit in said object note and a tens place equal to a number of transition paths for carrying.

2. The device of claim 1, wherein said nine digits (1, 2, 3, 4, 5, 6, 7, 8, 9) locate on node (1, 1), node (1, 2), node (1, 3), node (2, 1), node (2, 2), node (2, 3), node (3, 1), node (3, 2), node (3, 3) respectively of said 3×3 array nodes, wherein said four digits (2, 4, 6, 8) locate on node (1, 1), node (1, 2), node (2, 1), node (2, 2) respectively of said 2×2 array nodes.

3. The device of claim 1, wherein holes transition orders of said first type of diagram-configured carrier are as follows: $1^{st}$ hole (1, 1) proceeding to $2^{nd}$ hole (1, 2) via transition path 1, $2^{nd}$ hole (1, 2) proceeding to $3^{rd}$ hole (1, 3) via transition path 2, $3^{rd}$ hole (1, 3) proceeding to $4^{th}$ hole (2, 1) via transition path 3, $4^{th}$ hole (2, 1) proceeding to $5^{th}$ hole (2, 2) via transition path 4, $5^{th}$ hole (2, 2) proceeding to $6^{th}$ hole (2, 3) via transition path 5, $6^{th}$ hole (2, 3) proceeding to $7^{th}$ hole (3, 1) via transition path 6, $7^{th}$ hole (3, 1) proceeding to $8^{th}$ hole (3, 2) via transition path 7, $8^{th}$ hole (3, 2) proceeding to $9^{th}$ hole (3, 3) via transition path 8, and $9^{th}$ hole (3, 3) proceeding to said tenth node via transition path 9.

4. The device of claim 1, wherein holes transition orders of said second type of diagram-configured carrier are as follows: $1^{st}$ hole (1, 1) proceeding to $2^{nd}$ hole (1, 2) via transition path 1, $2^{nd}$ hole (1, 2) proceeding to $3^{rd}$ hole (2, 1) via transition path 2, $3^{rd}$ hole (2, 1) proceeding to $4^{th}$ hole (2, 2) via transition path 3, $4^{th}$ hole (2, 2) proceeding to $5^{th}$ node via transition path 4.

5. The device of claim 1, wherein hole transition orders of said third type of diagram-configured carrier are as follows: hole (1, 1) proceeding to said center hole via transition path 1, said center hole proceeding to hole (1, 2) via transition path 2, hole (1, 2) proceeding to said center hole via transition path 3, said center hole proceeding to hole (2, 2) via transition path 4, hole (2, 2) proceeding to said center hole via transition path 5, said center hole proceeding to hole (2, 1) via transition path 6, hole (2, 1) proceeding to said center hole via transition path 7, and said center hole proceeding to hole (1, 1) via transition path 8, and hole (1, 1) proceeding to said sixth node via transition path 9.

6. The device of claim 1, wherein degree of rotating is 90, 180 or 270.

7. The device of claim 1, wherein said first transition paths, said second transition paths and said third transition paths are divided into two types, the first type of transition paths are indicated by bold line and are thicker than second type of transition path, and located between changing column or raw holes and reaching to the node with digit 0 therein.

8. The device of claim 1, wherein said first type of visual teaching tool, said second type of visual teaching tool, and said third type of visual teaching tool are made from paper or plastic.

* * * * *